United States Patent [19]

Sakai et al.

[11] Patent Number: 5,138,457
[45] Date of Patent: Aug. 11, 1992

[54] TELEVISION RECEIVER HAVING A SYSTEM FOR REDUCING INTERFERENCE OF A FIRST AUDIO SIGNAL CARRIER TO A SECOND AUDIO SIGNAL CARRIER

[75] Inventors: Yuji Sakai, Shizuoka; Masashi Ohta, Tokyo, both of Japan

[73] Assignee: Sony Corporation, Tokyo, Japan

[21] Appl. No.: 578,670

[22] Filed: Sep. 7, 1990

[30] Foreign Application Priority Data

Sep. 8, 1989 [JP] Japan .................................. 1-234184

[51] Int. Cl.⁵ .................................................. H04N 5/60
[52] U.S. Cl. .............................................. 358/196; 358/191.1; 358/198
[58] Field of Search .................... 358/188, 191.1, 196, 358/197, 198, 143, 144; 455/143, 206; 370/11; 375/25, 85, 86

[56] References Cited

U.S. PATENT DOCUMENTS

| | | | |
|---|---|---|---|
| 4,107,730 | 8/1978 | Jones | 358/196 |
| 4,646,150 | 2/1987 | Robbins et al. | 358/144 |
| 4,718,086 | 1/1988 | Rumreich et al. | 358/198 |
| 4,745,476 | 5/1988 | Hirashima | 358/143 |
| 4,922,537 | 5/1990 | Frederiksen | 375/122 |
| 4,956,862 | 9/1990 | Robbins et al. | 358/144 |
| 5,034,994 | 7/1991 | Muterspaugh et al. | 358/191.1 |

*Primary Examiner*—James J. Groody
*Assistant Examiner*—Jeffrey S. Murrell
*Attorney, Agent, or Firm*—Hill, Van Santen, Steadman & Simpson

[57] ABSTRACT

A television receiver for receiving a first audio signal which is FM modulated and which has a carrier with a first predetermined frequency difference from a carrier of a video signal. A second audio signal is PCM modulated. The carrier has a second predetermined frequency difference from the carrier of the video signal. A tuner is provided for receiving an RF signal and for generating an IF signal. A video detecting means detects a video IF signal. An FM audio detecting means detects the first audio signal. A PCM audio detecting means detects the second audio signal. An audio IF detecting means is connected between the tuner and the FM audio detecting means or PCM audio detecting means.

10 Claims, 2 Drawing Sheets

TELEVISION RECEIVER HAVING A SYSTEM FOR REDUCING INTERFERENCE OF A FIRST AUDIO SIGNAL CARRIER TO A SECOND AUDIO SIGNAL CARRIER

BACKGROUND OF THE INVENTION

The present invention relates to a television receiver.

In Europe, as a method of television broadcasting, there is known a system called NICAM (Near Instantaneous Compound Audio Multiplex). According to the NICAM system, as shown in FIG. 1, a carrier CV of the video signal, a first audio signal carrier C1, and a second audio signal carrier C2 which have different frequencies compared to a frequency $f_{cv}$ of the carrier CV of the video signal are provided.

The above first audio signal carrier C1 is a carrier of a frequency modulated analog audio signal. The second audio signal carrier C2 is a carrier of a digitally modulated DQPSK—differential 4-phase PSK PCM audio signal.

The above analog audio signal is a first audio signal SV1 and the signal obtained by modulating the first audio signal carrier C1 by the first audio signal SV1 is a first modulated audio signal SV100. On the other hand, the above PCM audio signal is a second audio signal SV2. The signal obtained by modulating the second audio signal carrier C2 by the second audio signal SV2 is a second modulated audio signal SV200.

An intermediate frequency IF is set to 38.9 MHz. Frequencies $f_{c1}$ and $f_{c2}$ of the first and second audio signal carriers C1 and C2 are specified as follows. That is, the intermediate frequency IF of 38.9 MHz is set as a reference, and in a direction such that the frequency becomes low. According to the B system of the VHF band and the G system of the UHF band, the frequency $f_{c1}$ of the first audio signal carrier C1 is set to a position of 5.5 MHz and the frequency $f_{c2}$ of the second audio signal carrier C2 is set to a position of 5.85 MHz, respectively. According to the I system, the frequency $f_{c1}$ of the first audio signal carrier C1 is set to a position of 6.0 MHz and the frequency $f_{c2}$ of the second audio signal carrier C2 is set to a position of 6.552 MHz, respectively.

In the television receiver of the NICAM system, a SAWF (Surface Acoustic Wave Filter: hereinafter referred to as a SAW filter in the specification) is used. Conventional frequency characteristics of the SAW filter are, for instance, as shown by a solid line L2 in FIG. 1. According to the characteristics shown by the solid line L2, the level of the frequency $f_{c1}$ of the first audio signal carrier C1 and the level of the frequency $f_{c2}$ of the second audio signal carrier C2 are set to be almost equal.

Level ratios of the first and second audio signal carriers C1 and C2 to the carrier CV of the video signal as mentioned above are decided as follows by a standard. That is, assuming that the levels of the carriers CV, C1 and C2 are set to LCV, LC1 and LC2, respectively, it is determined that LCV/LC1=13 dB and LCV/LC2=20 dB. Therefore, the above level ratios are used as input conditions of the SAW filter to detect them.

However, under such input conditions, in the case where the frequency characteristics of the RF signal change by a standing wave ratio (SWR) of the transmission system, and upon demodulation of the second modulated audio signal SV200, the level of the second audio signal carrier C2 decreases, the level ratio (LC1/LC2) increases, and the level of the first audio signal carrier C1 relatively increases. Therefore, an interference of the first audio signal carrier C1 to the second audio signal carrier C2 increases, so that an error rate of the second audio signal SV2 deteriorates. On the other hand, to avoid the interference of the first audio signal carrier C1 to the second audio signal carrier C2, a sensitivity of a detecting circuit to detect the second audio signal SV2 cannot help being lowered.

SUMMARY OF THE INVENTION

It is an object of the invention to provide a television receiver which can eliminate an interference of the first audio signal carrier to the second audio signal carrier.

According to one aspect of the invention, there is provided a television receiver for receiving a first audio signal which is FM modulated and which carrier has a first predetermined frequency difference from a carrier of a video signal, and a second audio signal which is PCM modulated and which carrier has a second predetermined frequency difference from the carrier of the video signal. A tuner for receiving an RF signal and for generating an IF signal is provided. A video detecting means detects a video IF signal. An FM audio detecting means detects the first audio signal. A PCM audio detecting means detects the second audio signal. An audio IF detecting means is connected between the tuner and the FM audio detecting means or PCM audio detecting means.

The above, and other objects, features and advantages of the present invention will become readily apparent from the following detailed description thereof which is to be read in connection with the accompanying drawings.

DESCRIPTION OF THE PREFERRED EMBODIMENTS

Figure 1:
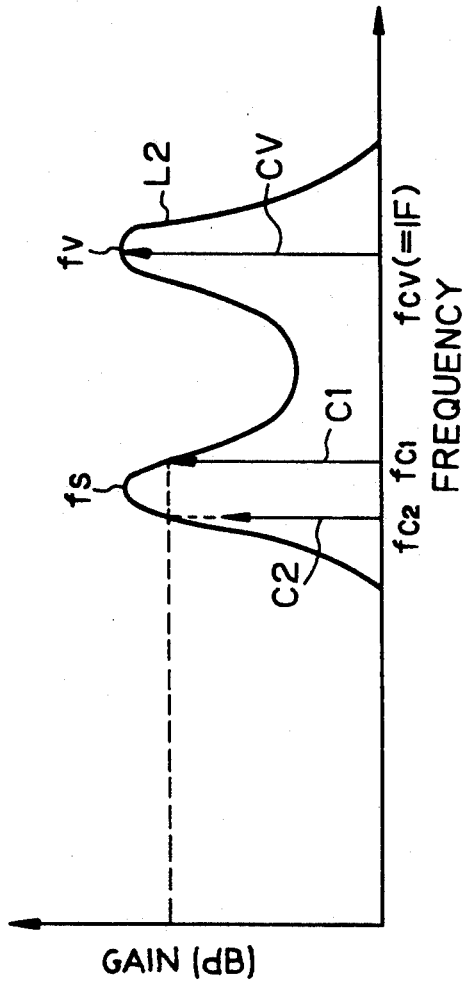
FIG. 1 is a graph showing frequency characteristics of carriers in a SAW filter in the NICAM system.
Figure 2:
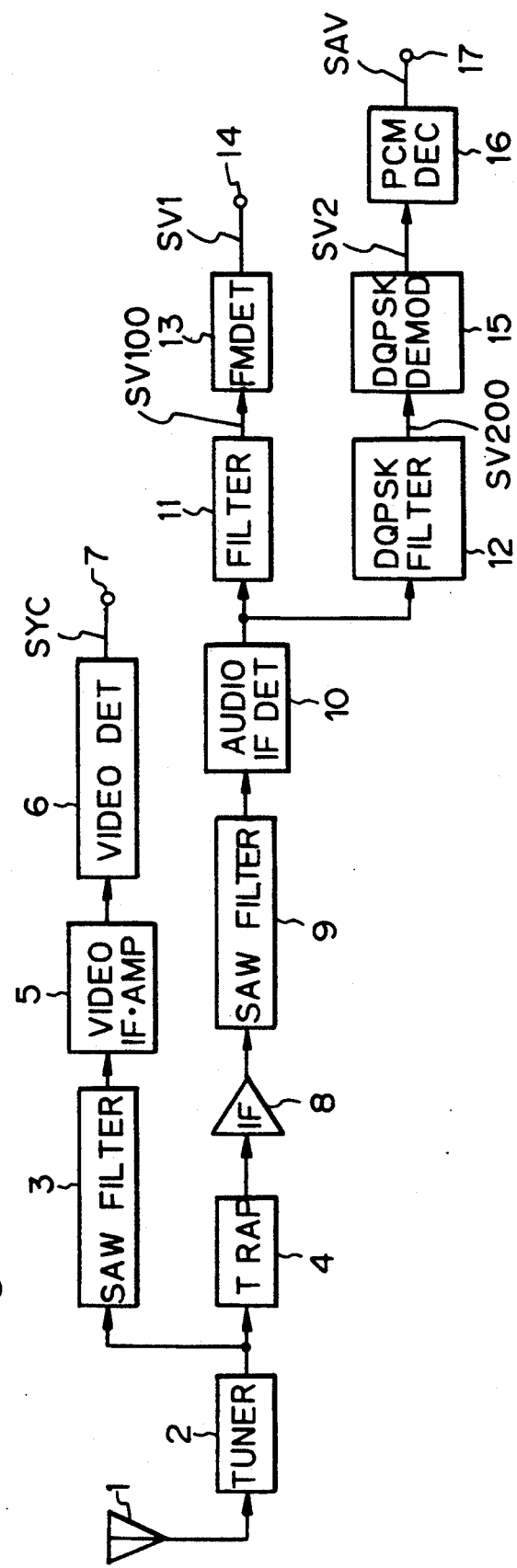
FIG. 2 is a block diagram showing an embodiment of the television receiver according to the present invention.
Figure 3:
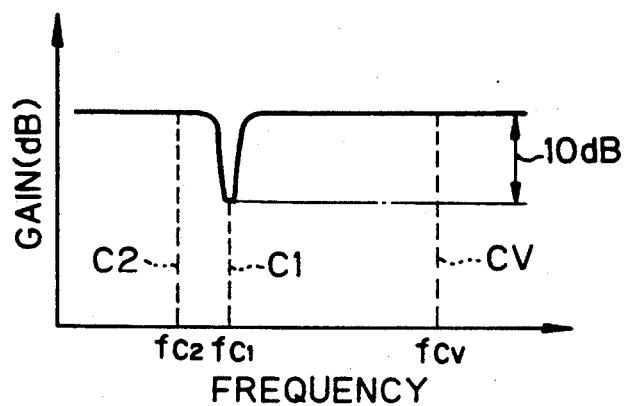
FIG. 3 is a graph showing frequency characteristics of a trap circuit which is used in an embodiment of the television receiver according to the present invention.

An embodiment of the invention will be described hereinbelow with reference to FIGS. 2 and 3. In the embodiment, the invention is applied to a television receiver of the NICAM system as shown in FIGS. 2 and 3. In the drawings, symbols which are common to those in the conventional apparatus are the same, and overlapping descriptions are omitted.

In FIG. 2, a television signal from an antenna 1 is supplied to a tuner circuit 2. The television signal of a desired channel is selected and amplified by the tuner circuit 2. This television signal is converted into an intermediate frequency signal by a mixing circuit of the tuner circuit 2. The intermediate frequency signal which is output from the tuner circuit 2 is supplied to a SAW filter 3 and a trap circuit 4, respectively.

In the SAW filter 3, a video intermediate frequency signal is separated from the intermediate frequency signal which is supplied from the tuner circuit 2. After the video intermediate frequency signal is amplified by a video intermediate frequency amplifying circuit 5, it is supplied to a video detecting circuit 6. The video detection is executed by the video detecting circuit 6 so that a composite color video signal SYC is extracted and taken out from a terminal 7.

On the other hand, in the trap circuit 4, the level of the frequency of the first audio signal carrier C1 of the intermediate frequency signal which is supplied from the tuner circuit 2 is attenuated in a range such that a sensitivity to a monaural audio signal does not deteriorate. That is, as shown in FIG. 3, the trap circuit 4 functions to reduce the level of the first audio signal carrier C1 by about 10 dB. After the intermediate frequency signal transmitted through the trap circuit 4 is amplified by an audio intermediate frequency amplifying circuit 8, it is supplied to a SAW filter 9.

Characteristics of the SAW filter 9 shown in this embodiment are set to be similar to those in the conventional one. The above intermediate frequency signal is supplied to an audio intermediate frequency detecting circuit 10.

A signal in which the first modulated audio signal SV100 and the second modulated audio signal SV200 are multiplexed to a luminance signal in a base band is obtained from the audio intermediate frequency detecting circuit 10. This signal is supplied to filter 11 and to a differential 4-phase PSK filter 12.

The filter 11 is constructed so that a signal having a frequency of about, for instance 5.5 MHz, can pass. Therefore, the first modulated audio signal SV100 which has a frequency of 5.5 MHz and was frequency modulated is separated and supplied from the filter 11 to a frequency demodulating circuit 13. In the frequency demodulating circuit 13, a frequency demodulation is executed for the first modulated audio signal SV100, and the frequency demodulated first audio signal SV1 is obtained at the terminal 14.

On the other hand, in the differential 4-phase PSK filter 12, the second modulated audio signal SV200 is separated and supplied to a demodulating circuit 15. In the demodulating circuit 15, the second audio signal SV2 is demodulated, and the demodulated output is supplied to a PCM decoder 16. In the PCM decoder 16, the supplied second audio signal SV2 is supplied to a D/A converter (not shown) provided in the PCM decoder 16, so that the second audio signal SV2 is converted into the analog audio signal SAV. The analog audio signal SAV is extracted from a terminal 17.

According to the embodiment, since the trap circuit 4 decreases the level of the first audio signal carrier C1 by about 10 dB relative to the level of the second audio signal carrier C2, an interference of the first audio signal carrier C1 to the second audio signal carrier C2 is eliminated. Therefore, even if the level of the second audio signal carrier C2 is decreased, the interference of the first audio signal carrier C1 can be eliminated, so that the error rate of the second audio signal SV2 does not deteriorate and there is no need to lower the sensitivity of the circuit to detect the second audio signal SV2.

Another embodiment of the invention will now be described. It differs from the above embodiment in that the trap circuit 4 is eliminated and a SAW filter having frequency characteristics shown in FIG. 4 is used in place of the SAW filter 9.

Figure 4:
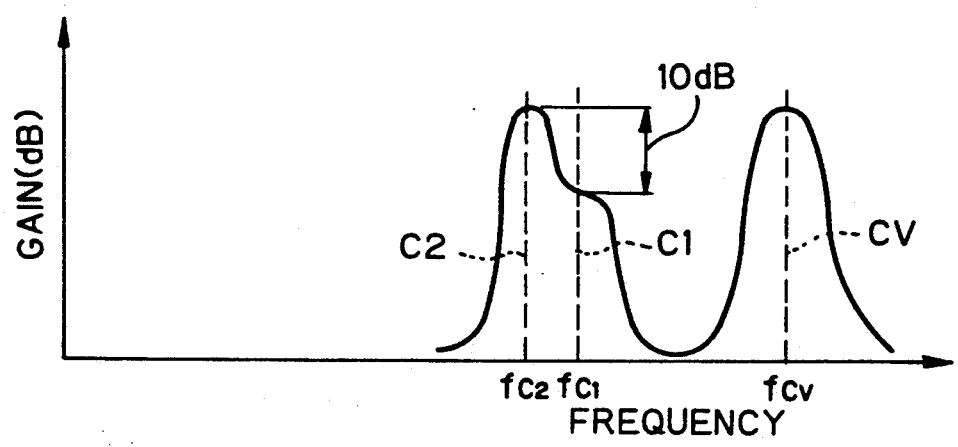
FIG. 4 is a graph showing frequency characteristics of a SAW filter which is used in another embodiment of the television receiver according to the present invention.

As shown in FIG. 4, the SAW filter is set so that the first audio signal carrier C1 is attenuated by about 10 dB relative to the second audio signal carrier C2.

Therefore, even in this embodiment, in a manner similar to the above embodiment, the level of the first audio signal carrier C1 can be reduced by about 10 dB relative to a level of the second audio signal carrier C2, so that the interference of the first audio signal carrier C1 to the second audio signal carrier C2 is eliminated.

Since the other contents are similar to those in the first embodiment, overlapping descriptions are omitted.

As shown in the first embodiment and the second embodiment mentioned above, a trap circuit 4 having the frequency characteristics shown in FIG. 3, or the SAW filter having the frequency characteristics shown in FIG. 4 is provided. Assuming that the levels of the carriers CV, C1, and C2 are respectively set to LCV, LC1, and LC2, when a television signal of LCV/LC1=13 dB, LC1/LC2=7 dB according to the standard of the NICAM system is received, LCV/LC1=20 dB and LC1/LC2=0 dB can be set on the input side of the audio intermediate frequency detecting circuit 10. Thus, the effect as mentioned above can be obtained.

According to the invention, since the means for attenuating the first audio signal carrier is provided at the front stage of the audio intermediate frequency detecting circuit provided in the television receiver, there is an effect such that the interference of the first audio signal carrier relative to the second audio signal carrier can be eliminated. Due to this, even in the case where the level of the second audio signal carrier is decreased, the interference of the first audio signal carrier is eliminated. Thus, there are effects such that the error rate of the second audio signal does not deteriorate and there is no need to lower the sensitivity of the detecting circuit to obtain the second audio signal.

Although various minor changes and modifications might be proposed by those skilled in the art, it will be understood that we wish to include within the claims of the patent warranted hereon all such changes and modifications as reasonably come within our contribution to the art.

We claim as our invention:

1. A television receiver for receiving a first audio signal which is FM modulated and which has a first carrier having a first predetermined frequency difference relative to a carrier of a video signal, and a second audio signal which is PCM modulated and which has a second carrier having a second predetermined frequency difference relative to the carrier of the video signal, comprising:

tuner means for receiving RF signals and for generating IF signals;
video detecting means connected to receive said IF signals and for detecting a video IF signal;
FM audio detecting means for detecting said first audio signal;
PCM audio detecting means for detecting said second audio signal;
audio IF detecting means for receiving said IF signals connected between said tuner means and said FM audio detecting means and PCM audio detecting means;
a SAW filter connected before an input to said audio IF detecting means; and
a trap circuit connected before an input to said SAW filter which has a lower frequency response at a frequency corresponding to said first audio signal compared to a frequency response at a frequency corresponding to said second audio signal.

2. A television receiver according to claim 1, wherein said SAW filter has frequency responses for said first and second audio signals such that a gain at a frequency corresponding to said first audio signal is approximately the same as a gain at a frequency corresponding to said second audio signal.

3. A television receiver according to claim 1, wherein said trap circuit has a frequency response for said first audio signal which is 10 dB lower than a frequency response for said second audio signal.

4. A television receiver according to claim 1 wherein said RF signals received by the tuner means of the television receiver comprise NICAM signals broadcasted in Europe.

5. A television receiver for receiving a first audio signal which is FM modulated and which has a first carrier having a first predetermined frequency difference relative to a carrier of a video signal, and a second audio signal which is PCM modulated and which has a second carrier having a second predetermined frequency difference relative to the carrier of the video signal, comprising:
   tuner means for receiving RF signals and for generating IF signals;
   video detecting means connected to receive said IF signals and for detecting a video IF signal;
   FM audio detecting means for detecting said first audio signal;
   PCM audio detecting means for detecting said second audio signal;
   audio IF detecting means for receiving said IF signals connected between said tuner means and said FM audio detecting means and PCM audio detecting means; and
   a SAW filter connected before an input to said audio IF detecting means and having a frequency response such that a gain at a frequency corresponding to said second audio signal is greater than a gain at a frequency corresponding to said first audio signal.

6. A television receiver according to claim 5, wherein said SAW filter has a 10 dB lower frequency response for said first audio signal than a frequency response for said second audio signal.

7. A television receiver according to claim 5 wherein said RF signals received by the tuner means of the television receiver comprise NICAM signals broadcasted in Europe.

8. A television receiver, comprising:
   means for receiving a first audio signal which is modulated with a first type of modulation and which has a first carrier having a first predetermined frequency difference relative to a carrier of a video signal, and a second audio signal which is modulated with a second type of modulation which has a second carrier having a second predetermined frequency difference relative to the carrier of the video signal; and
   said means including tuner means for receiving RF signals including said first and second carriers and said video signal carrier and for generating corresponding IF signals, first audio detecting means for detecting said first audio signal, second audio detecting means for detecting said second audio signal, audio IF detecting means for receiving said IF signals connected between said tuner means and said first audio detecting means and second audio detecting means, and means for providing a smaller frequency response for the carrier associated with said first audio signal compared to a frequency response provided for the carrier associated with said second audio signal.

9. A television receiver for receiving a first audio signal which is FM modulated and which has a first carrier of a first predetermined frequency difference relative to a carrier of a video signal, and a second audio signal which is PCM modulated and which has a second carrier of a second predetermined frequency difference relative to the carrier of the video signal, comprising;
   tuner means for receiving an RF signal and for generating IF signals;
   trap circuit means connected to the tuner means for attenuating the carrier associated with the first audio signal relative to the carrier associated with the second audio signal;
   SAW filter means connected to an output of said trap circuit means and having a gain peak substantially centered relative to said first and second audio signal carriers such that a gain is approximately the same for both the first and second audio signal carriers;
   audio IF detecting means connected to an output of said SAW filter means;
   FM audio detecting means for detecting said first audio signal connected to an output of said audio IF detecting means; and
   PCM audio detecting means for detecting said second audio signal connected to an output of said audio IF detecting means.

10. A television receiver for receiving a first audio signal which is FM modulated and which has a first carrier having a first predetermined frequency difference relative to a carrier of a video signal, and a second audio signal which is PCM modulated and which has a second carrier having a second predetermined frequency difference relative to the carrier of the video signal, comprising:
   tuner means for receiving an RF signal and for generating IF signals;
   SAW filter means connected to an output of said tuner means and having a gain peak substantially centered about said second audio signal carrier and a lower gain at said first audio signal carrier;
   audio IF detecting means connected to an output of said SAW filter means;
   FM audio detecting means for detecting said first audio signal connected to an output of said audio IF detecting means; and
   PCM audio detecting means for detecting said second audio signal connected to an output of said audio IF detecting means.

* * * * *